May 24, 1927.  J. WOLF-MARJANSKI  1,630,246
MUSICAL TRANSFORMATION CHART
Filed Jan. 18, 1921
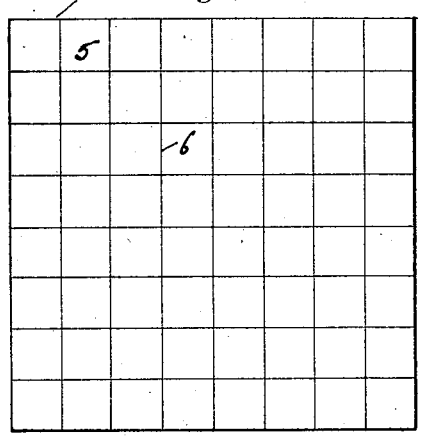
Fig:1.
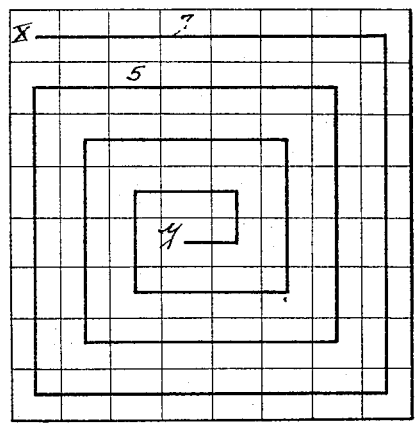
Fig:2.
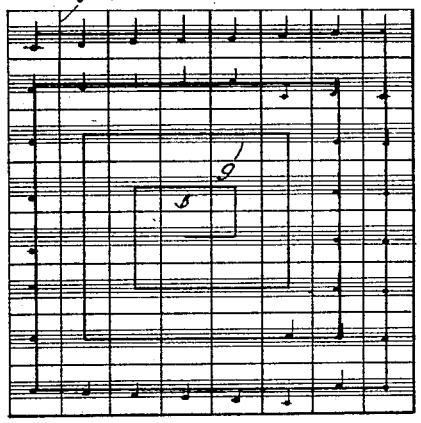
Fig:3.
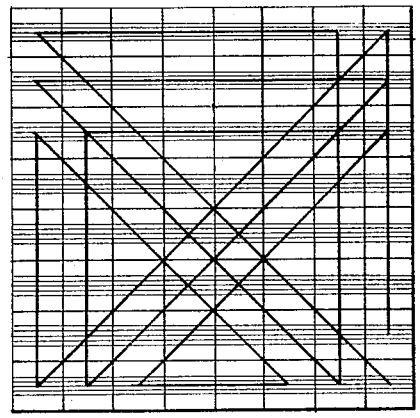
Fig:4.
INVENTOR
John Wolf Marjanski
BY C. P. Goepel
ATTORNEY Patented May 24, 1927.

1,630,246

UNITED STATES PATENT OFFICE.

JOHN WOLF-MARJANSKI, OF NEW YORK, N. Y.

MUSICAL TRANSFORMATION CHART.

Application filed January 18, 1921. Serial No. 438,120.

This invention relates to means for facilitating musical composition and has for its primary object to provide one or more experimental charts upon which the notes are written in such a manner that they may be read successively along a great variety of geometrical lines or figures at the selection of the user to produce numerous tone lines or groups which may be selectively arranged to form melodic musical progressions.

The invention also has for its purpose to provide means of the above character for facilitating musical composition wherein entertainment is combined with instruction in the fundamentals of music by enabling the user to produce melodic progressions, or in other words, tone-lines, from notes, chords, from scale passages, or from a mixture of them, or to produce rhythmic groups. Thus my invention affords an incentive to study and practice, and the first step, namely, learning to read the notes, and the fundamentals of music in general, becomes a real pleasure instead of a distasteful task. My invention in no way interferes with the use by the student of recognized up-to-date methods of musical instruction, but as a matter of fact is an additional help and serves to enliven the lagging interest of the student. Further, the use of my present improvement results in the rapid development of sight-reading, an ability to grasp the relation of a group of notes at a glance so that the memorizing of the notes becomes a simple matter, and together with practice at a musical instrument or vocally enables the student to quickly acquire a certain degree of proficiency.

In one form of my invention, I propose to provide a series of experimental musical charts in the form of a tablet and upon a number of tablet sheets, the musical notes or symbols may be written by the student and then read in various ways to produce different tone groups or scale passages which can be separately set down or written and from which selections may be made so as to form a progression of notes resulting in a musical melody which will be pleasing to the ear.

Other objects of the present invention will be more fully understood from the following description considered in connection with the accompanying drawing, in which Figure 1 is a plan view illustrating the fundamental principle of the present invention;

Figure 2 is a similar view diagrammatically illustrating one geometrical form or outline in which the notes or symbols written on the chart may be successively read;

Figure 3 is a plan view of a partially completed chart.

Figure 4 is a view similar to Figure 3 but diagrammatically illustrating another geometrical form or outline in which the notes may be read and which will produce different tone groups from those which will be obtained by following the geometrical outline shown in Figure 2.

The experimental chart consists of a rectangular sheet of paper or cardboard which may be of any desired area. The surface of this chart is subdivided into a plurality of square spaces of equal area designated by the numeral 5, by printing or otherwise delineating upon the surface of the sheet the equi-distantly spaced intersecting lines 6. In the drawings I have illustrated eight of the squares or spaces 5 in each row, both horizontally and vertically, though, if desired, the surface of the chart can be divided up into a greater number of said spaces.

In addition to the intersecting lines 6 there is also printed upon the surface of the chart centrally of each horizontal row of the squares 5 the conventional staff 9 consisting of the customary five spaced parallel lines upon which musical notes or symbols may be written.

In the use of the chart as above described, one note is written in each of the squares 5 of the chart. Thus the ascending or descending scale, the first or second tetrachord or a chord line, or a mixture of both, that is, a scale and chord line, or any group of notes may be spread over the chart horizontally from left to right, placing the notes successively in the square spaces 5. These notes may be either whole, half, quarter or eighth notes and any scale may be selected. In the example shown in Figure 3 of the drawing I have used the scale of C. Of course it is understood that, if desired, instead of arranging the notes to read from left to right, they may be arranged in the spaces of the chart either vertically or diagonally in proper sequence and then read successively in another direction. Horizontal rows of notes may be set down upon the several staffs, and may be successively read, beginning at the upper left hand corner of the chart and following in the order indicated by the line 7 in Figure 2. It is understood that this line 7 is not printed upon the surface of the chart but simply indicates one way in which the notes may be read. Thus the rows of notes corresponding to the horizontal and vertical portions of the line 7 may be separately set down in a book or tablet, if they have an intelligible and agreeable sound which would indicate that they could be advantageously used in a composition. Again, the reading of the notes on the chart may proceed in the geometrical order shown in Figure 4 of the drawings. In addition to the order of reading the notes indicated by the diagrams in Figures 2 and 4, it is apparent that numerous other geometrical conformations might be adopted and in this way a great multitude of separate rows of notes would be obtained. Of course, many of these rows of notes would be wholly unintelligible and useless, and they would be discarded. However, instances may occur, where, by the addition of certain notes to these otherwise unharmonious and disagreeable note rows, or by subtraction of notes therefrom and rearranging the notes, they will give an agreeable and intelligent sound when played or sung. From these rows of notes motives may be constructed and diatonic, chromatic, harmonic, reiterated tones produced. Of course, a certain elementary knowledge on the part of the student is assumed and from such knowledge he may produce purely rhythmic motives in 4/4, 3/4, 3/8 or 6/8 time and apply them to the various tone groups. Of course to be worthy of repeated application, a motive must possess characteristic qualities, either in its succession of tones or in its rhythm, or in both.

Of course there is no exact formula for the writing of musical melodies. A certain technical equipment may be acquired, but originality is an essential requisite. One must learn to think in terms of music. I have found that facility may be acquired along this line by the various rows of notes and the infinite number of combinations which may be developed therefrom by the use of my improved experimental chart or tablet. Of course, such successions of musical notes put together in this way are not likely to have any artistic worth, but if by manipulation of these note rows or varying the order of their succession, facility in the production of harmonious tone groups is developed, (and this is the first goal to be attained in the acquisition of musical education,) the experimental chart or tablet may, therefore, be advantageously used by the composer or the advanced student when inspiration fails. The further development of the tone lines which may be obtained by the user of the chart, such as the harmonic treatment thereof and the choosing of rhythmic details is left to the art of the musician.

From the foregoing description it is believed that the nature of my present invention and the manner in which it may be advantageously used to assist the musical composer or music student so that he will not have to rely entirely upon inspiration, will be readily understood. The accompanying drawing is merely illustrative of several practical forms in which I propose to produce the improved experimental chart or tablet. The tablet sheets may be of any desired size and each sheet may have printed thereon one or more of the experimental charts as shown in the drawing.

Accordingly it is to be understood that I do not desire to be limited to the exact features of the invention as herein shown but reserve the privilege of adopting all such legitimate changes as may be fairly embodied within the spirit and scope of the invention as claimed.

I claim:

1. A musical transformation and directional chart, comprising a body part having a surface divided into squares of equal size, said squares registering both transversely and longitudinally and being in number sufficient to dispose eight squares in each row to correspond to the eight notes of a musical scale, a direction indicating diagram superposed on the surface of the body part and comprising a line having a point of commencement and a point of ending and disposed to intersect all of said squares, said squares having therein the conventional music notation lines and spaces and thereby adapted to receive therein each a musical notation of a given scale with the notations in the consecutive order of the scale and in the squares consecutively designated by said diagram, whereby different transformations may be made by reading the notations transversely and longitudinally in the rows, and also diagonally through the rows.

2. A musical transformation and directional chart comprising a body part having a surface divided into rows of configurations, and a direction indicating diagram superposed on the surface of the body part and comprising a line having a point of commencement and a point of ending and disposed to intersect all of said configurations, said configurations having therein the conventional music notation lines and spaces and thereby adapted to receive therein each a musical notation of a given scale with the notations in the consecutive order of the scale and disposed in configurations consecutively designated by said diagram, whereby different transformations may be made by reading the notations in different transverse and longitudinal directions in the rows of the configurations.

In testimony that I claim the foregoing as my invention, I have signed my name hereunder.

JOHN WOLF-MARJANSKI.